Patented Apr. 19, 1938

2,114,292

UNITED STATES PATENT OFFICE 2,114,292

POLYMERIZATION PRODUCTS AND PROCESSES FOR PRODUCING THE SAME

Frederick E. Frey, Louis Henry Fitch, Jr., and Robert Dewey Snow, Bartlesville, Okla.; The First National Bank in Bartlesville, administrators of said Louis Henry Fitch, deceased, assignors to Phillips Petroleum Company, a corporation of Delaware No Drawing. Application January 26, 1934, Serial No. 708,521

3 Claims. (Cl. 260—2)

This invention relates to the manufacture of new and useful products, generally of high molecular weight, or polymeric in nature, by causing sulfur dioxide to react with unsaturated compounds other than the olefin or conjugated diolefin hydrocarbons, and to processes by which such reactions can be made to take place.

A further object of the invention is to produce high molecular weight compounds containing sulfur dioxide and having incorporated in the molecule, radicals such as the hydroxyl or carboxyl, capable of undergoing further reaction with suitable chemical agents.

Other objects will appear as the invention is more fully described.

Prior literature references to the reactions of $SO_2$ with unsaturated compounds are confined to the olefin and diolefin hydrocarbons. Mathews and Elder, Brit. 11,635, 1914, claim the reaction of liquid $SO_2$ with olefinic hydrocarbons, such as ethylene, propylene, and butylenes in sunlight or ultraviolet light. De Bruin, Chem. Abs. 9,623 (1915) found that the conjugated diene, isoprene, when allowed to stand with liquid $SO_2$, forms a crystalline compound. Mathews and Strange, U. S. 1,196,259 (1916), react isoprene and other conjugated diolefins with $SO_2$ in the presence of halogen compounds such as HCl, iodine or acetyl chloride, which promote the formation of the crystallizable sulfoxide. Badische Aniline and Sodafabrik, Ger. 236,386 (1911), Staudinger, Ger. 506,839 (1930), and Perkins, Can. 329,043, (1933), disclose the reaction of $SO_2$ with olefins having conjugated double bonds. Leopold Singer in French Pat. 515,590 (1921) discloses a process for the production of lacquers, varnishes, etc., by reacting sulfurous acid with mineral oils. In these references to the prior art, no mention is made of the reaction of $SO_2$ with unsaturated compounds other than simple olefins and conjugated diolefins. Furthermore, since methods for the reaction of many of the simple olefinic hydrocarbons are still unknown, it does not necessarily follow from the previous disclosures that unsaturated compounds other than hydrocarbons would react with $SO_2$. We have found, however, that many compounds other than simple olefins and conjugated diolefin hydrocarbons react with $SO_2$ to form high molecular weight polymers of a resinous nature.

We have reacted the following materials with sulfur dioxide:

The unsaturated halogen derivatives, vinyl chloride and allyl chloride react readily with liquid $SO_2$ in the presence of a catalyst or in light. The vinyl chloride forms a white solid which is insoluble in $SO_2$, but which can be molded by heat and pressure. The allyl chloride forms a water white, glassy product somewhat soluble in $SO_2$. After molding by heat and pressure, the resin exhibits high mechanical strength. The unsaturated alcohol, allyl alcohol, reacts readily with $SO_2$ in the presence of catalyst or light. The solid resin obtained has a very high tensile strength.

The unsaturated ether, allyl ethyl ether, reacts readily with $SO_2$ in the presence of catalyst or light. The solid resinous product can be molded by heat and pressure.

The olefin oxides, or inner ethers, ethylene oxide and propylene oxide react relatively more slowly with $SO_2$ in the presence of catalyst or light at temperatures up to 40° C. but preferably at about 0° C. The products are viscous fluids useful as softening agents, plasticizers, and solvents.

The unsaturated ester, ethyl acrylate, reacts readily with $SO_2$ in the presence of light or catalyst to form a soft, rubbery product soluble in $SO_2$ and many organic solvents.

When $SO_2$ is passed into an unsaturated amine compound such as allylamine, the first energetic reaction is evidently between the $-NH_2$ group and the $SO_2$. If after this reaction is complete, an excess of $SO_2$ is added and the mixture is exposed to light, a further reaction takes place, forming a compound of high molecular weight.

Diallyl, a diolefin not having conjugated double bonds and consequently not being capable of undergoing 1-4 addition of $SO_2$, was found to react rapidly with $SO_2$ to form a white insoluble difficultly fusible solid.

The unsaturated aldehyde, acrolein, reacts slowly with $SO_2$ in the presence of light or catalyst. The reaction can best be carried out at temperatures below atmospheric. The product is a solid insoluble in $SO_2$.

The unsaturated acids, acrylic, allylacetic, and undecylenic react readily with $SO_2$ in the presence of a catalyst or light. The products are insoluble in the excess $SO_2$. They are softer than the products obtained from olefinic hydrocarbons of the same number of carbon atoms, the product of undecylenic acid being very soft and pliable.

The acetylene derivatives, ethyl acetylene and phenyl acetylene, react with $SO_2$ in the presence of light or a catalyst.

The acetylene polymers, vinyl acetylene, divinyl acetylene, and poly-divinylacetylene, react slowly in liquid $SO_2$ in the light or in the presence of a catalyst to form an insoluble brown solid.

The furane derivative, furfuryl alcohol, reacts with $SO_2$ in the light or in the presence of a catalyst. A jet black solid material which is practically insoluble and can be molded only at high temperatures and pressures is formed.

Other compounds which we have converted to resins by reaction with $SO_2$ are: allyl cyanide, allyl isothiocyanate, allyl thiourea, and allyl urea.

Other materials which should react with $SO_2$ are: crotonyl alcohol, chloroprene, bromoprene, unsaturated vegetable oils such as tung oil, and partially chlorinated olefins such as the dichloride of diallyl.

In most cases we have found that the treatment of the unsaturated product to remove any absorbed oxygen and oxidation products prior to reaction is desirable.

Although the reaction involves approximately equimolecular proportions of $SO_2$ and unsaturated compound, the reaction product usually removes excess $SO_2$ from the reaction phase in the adsorbed or dissolved form. It is, therefore, generally desirable to use more than the molecular equivalent of $SO_2$.

Any of the catalysts for these reactions previously discovered and disclosed can be used, insofar as they are compatible with the unsaturated compound to be converted to resin.

Resinous products formed from mixtures of simple olefinic hydrocarbons and other unsaturated compounds appear to have properties which are generally intermediate between those formed from the individual constituents.

In many ways the production of resins from such compounds as unsaturated halogen derivatives, alcohols, ethers, esters, acids and aldehydes, or materials containing them, by reaction with $SO_2$ is highly desirable and advantageous. It would permit the production of resins having special properties; for example the allyl alcohol-$SO_2$ resin has unusually high tensile strength, while the undecylenic acid-$SO_2$ and ethyl acrylate-$SO_2$ resins are soft and rubbery. Then, too, a resin in which is tied up such a compound of multiple functions should be capable of further modification of properties by other chemical reactions after formation of the $SO_2$ complex. Apparently only the carbon to carbon double bond is involved in the resin reaction, leaving the other functional groups, such as hydroxyl or carboxyl, more or less free to undergo its characteristic reactions. Thus, an allyl alcohol resin or an acrylic acid resin might be esterified in the usual manner with acid anhydrides or alcohols, respectively, to produce resins with a wide range of properties. Still another advantage of the use of these compounds is that they can be used to modify the properties of resins from unsaturated hydrocarbons and $SO_2$. This may be accomplished in either of two ways; the unsaturated polyfunctional compound may be mixed with the unsaturated hydrocarbon and $SO_2$ before reaction, in which case opportunity is afforded for molecules of both types of unsaturated compounds to build into the same resin molecule; or the resins of the two types of compounds may be formed by reacting separately with $SO_2$, and then be blended in the desired proportions after reaction.

We have produced useful resinous products by the reaction of $SO_2$ with unsaturated compounds other than simple olefinic hydrocarbons and conjugated diolefinic hydrocarbons, have blended the resins so obtained with resins formed by the reaction of $SO_2$ with simple olefins and/or diolefins in order to modify the properties of the latter and have also mixed such unsaturated compounds with the simple olefins and diolefins and reacted the mixture with $SO_2$ under the proper conditions.

The following examples will illustrate the process of the present invention:

I. Equal volumes of liquid $SO_2$ and allyl chloride are sealed in a glass tube and exposed to sunlight or artificial light, preferably of short wave length. After the reaction has gone to completion, as indicated by the conversion of the fluid reactants to a stiff gel, the excess $SO_2$ is allowed to evaporate, leaving a white solid resin.

As a variation of the above, suitable for larger scale operation, the mixture of $SO_2$ and allyl chloride is placed in a bomb or autoclave provided with a suitable source of internal illumination and the reaction is promoted photochemically.

II. Equal volumes of liquid $SO_2$ and allyl alcohol are placed in a bomb or autoclave containing 0.01–0.1 per cent of silver nitrate, or other suitable catalyst and are allowed to react after thorough mixing. After the reaction has gone to completion, the excess $SO_2$ is allowed to escape and the solid resin is removed from the vessel.

Having described our invention, what we claim is:

1. The process of producing high molecular weight polymeric products which comprises reacting sulfur dioxide with unsaturated compounds selected from the group; vinyl chloride and allyl chloride.

2. The process of producing high molecular weight polymeric products which comprises reacting sulfur dioxide with vinyl chloride.

3. The process of producing high molecular weight polymeric products which comprises reacting sulfur dioxide with allyl chloride.

FREDERICK E. FREY.
LOUIS HENRY FITCH, Jr.
ROBERT DEWEY SNOW.